United States Patent
Baum

[11] Patent Number: 5,301,397
[45] Date of Patent: Apr. 12, 1994

[54] DEVICE FOR FASTENING A BOWDEN CABLE ON A CONSTRUCTIONAL ELEMENT

[75] Inventor: Heinz-Otto Baum, Giessen-Allendorf, Fed. Rep. of Germany

[73] Assignee: Emhart Inc., Newark, Del.

[21] Appl. No.: 943,811

[22] Filed: Sep. 11, 1992

[30] Foreign Application Priority Data

Sep. 11, 1991 [DE] Fed. Rep. of Germany ....... 9111309

[51] Int. Cl.⁵ .............................................. A44D 21/00
[52] U.S. Cl. .................................. 24/701; 24/590; 24/666
[58] Field of Search ............... 24/701, 702, 666, 669, 24/671, 667, 590

[56] References Cited

U.S. PATENT DOCUMENTS

| | | | |
|---|---|---|---|
| 657,683 | 9/1900 | Swearingen | 24/701 |
| 2,651,093 | 9/1953 | Lynch | 24/666 |
| 3,583,042 | 6/1971 | Ishizaka | 24/701 |
| 4,642,859 | 2/1987 | Kaiser | 24/669 |
| 4,677,713 | 7/1987 | Copp | 24/590 |
| 4,699,076 | 10/1987 | Curtis et al. | 24/701 |
| 4,932,105 | 6/1990 | Muller | 24/701 |

Primary Examiner—Victor N. Sakran
Attorney, Agent, or Firm—Edward D. Murphy

[57] ABSTRACT

A device for fastening the abutment of a bowden cable on a constructional element in which a T-bolt is fastened on the constructional element, a fastening tab is provided on the abutment the fastening tab has a keyhole-like recess, the recess has a greater opening for the passage of the head of the T-bolt and a smaller opening which is somewhat greater in diameter than the diameter of the shank of the T-bolt, and a collar for supporting the head of the T-bolt is provided round the small opening; when the T-bolt is introduced with its shank into the smaller opening of the recess and the head of the T-bolt rests on the collar. The abutment is secured on the constructional element.

5 Claims, 1 Drawing Sheet

DEVICE FOR FASTENING A BOWDEN CABLE ON A CONSTRUCTIONAL ELEMENT

BACKGROUND OF THE INVENTION

The invention relates to a device for fastening the abutment of a bowden cable on a constructional element.

In the past, abutments of bowden cables have been fastened on constructional elements by clips, for example as in the case of bicycles. This necessitates conformity between the shape of the abutment and the shape of the constructional element so as to rule out mutual displacement. Furthermore, these clips can become loose so they have to be monitored continuously in order not to impair or even completely prevent operation of the bowden cable. In addition, clips lead to a risk of injury from their projecting parts.

It is an object of the present invention to construct a device for fastening the abutment of a bowden cable on a constructional element so as to provide reliable, prolonged operation whilst having a simple design.

BRIEF DESCRIPTION OF THE INVENTION

According to the present invention, a device for fastening the abutment of a bowden cable on a constructional element comprises the following features:

a) a T-bolt is fastened on the constructional element;
b) the abutment has a fastening tab;
c) the fastening tab has a keyhole-like recess;
d) the recess has a greater opening for the passage of the head of the T-bolt and a smaller opening which is somewhat greater in diameter than the diameter of the shank of the T-bolt; and
e) a collar for supporting the head of the T-bolt is provided round the small opening.

The fastening device thus designed according to the invention still consists of only two parts, namely of a single-part abutment block and a T-bolt fastened on the constructional element. When this T-bolt is introduced with its shank into the smaller opening of the recess and the head of the T-bolt rests on the collar, the abutment is secured on the constructional element. To prevent unintentional release of this connection it is necessary to ensure, by suitable adjustment of the bowden cable, that a force acting in the direction of the T-bolt is continuously exerted on the base of the abutment by the sheath of the bowden cable. On the other hand, the connection can easily be released in that the abutment is displaced in the opposite direction and the head of the T-bolt can pass through the greater opening of the recess. Projecting parts which could cause an injury do not exist with the device according to the invention.

Advantageous further embodiments form the subject of claims 2 to 6.

The rigidity of the abutment block is increased by the connection of the fastening tab receiving the keyhole-like recess to the base of the abutment by obliquely rising walls.

The downward extension of these walls, more specifically also over the region of the cylindrical part of the abutment, ensures that the abutment can be adapted to constructional elements with slightly different rounding, but rotation of the abutment round the T-bolt is prevented.

A rotation of this type can be prevented with constructional elements having a plane surface by providing at least two T-bolts.

An inwardly projecting edge which is arranged in the smaller opening of the recess and still allows entry of the bolt shank serves for additionally securing the position of the shank in the smaller opening.

BRIEF DESCRIPTION OF THE DRAWINGS

In order that the invention can be better understood, a preferred embodiment will now be described in greater detail by way of example with reference to the accompanying drawings in which.

DETAILED DESCRIPTION OF PREFERRED EMBODIMENT AND DRAWINGS

Figure 1:
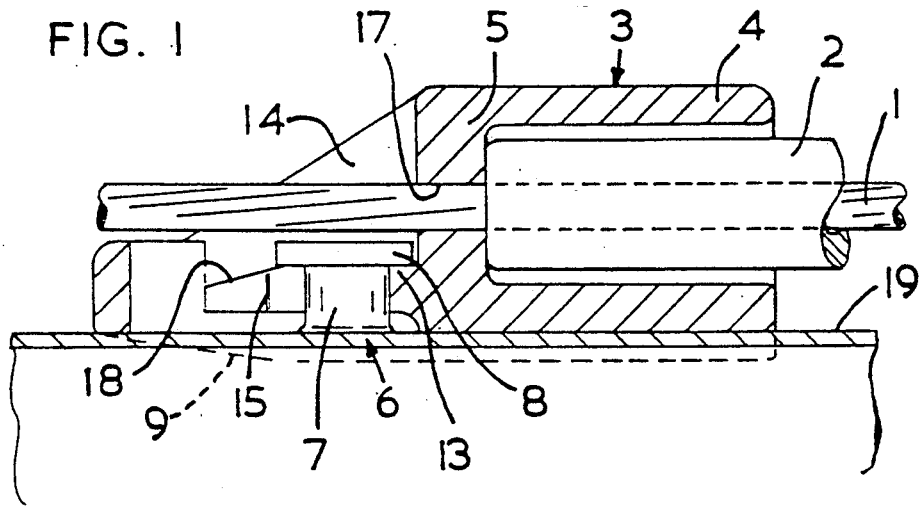
FIG. 1 shows the device in a side view, partially in section.

The bowden cable, of which abutment 3 is to be fastened on a constructional element 19 is designed in the form of a tube, usually consists of a transmission wire 1 and a sheath 2.

The sheath 2 rests on base 5 of the abutment 3 which also has a cylindrical part 4 spaced from and surrounding the sheath. A central opening 17 for the passage of the transmission wire 1 is provided in the base 5 of the abutment 3.

The abutment 3 carries a fastening tab 9 having a keyhole-like recess 10. The abutment 3 is produced integrally with the fastening tab 9. The recess 10 has a greater opening 11 and a smaller opening 12.

A T-bolt 6 having a shank 7 and an enlarged head 8 is rigidly connected to the constructional element 19. The T-bolt 6 is preferably welded on.

The greater opening 11 has a diameter which allows the passage of the head 8 and the smaller opening 12 a diameter which only allows lateral entry of the shank 7.

To fasten the abutment 3 on the constructional element, the abutment 3 is pushed with the great opening 11 over the head 8 of the T-bolt 6 and is then moved to the left (as viewed in FIG. 1) until the underside of the head 8 rests on a collar 13 surrounding the smaller opening 12. The abutment 3 is therefore prevented from lifting from the constructional element. The collar 13 passes via a ramp 18 into the greater opening 11.

To prevent unintentional release of the connection, it should be ensured that a force is exerted on the base 5 of the abutment 3 by the sheath 3 so that co-operation between head 8, shank 7 and collar 13 is maintained. The force exerted on the abutment 5 is introduced into the constructional element 19 via the T-bolt 6.

Additional protection against unintentional release of the fastening device is afforded by the inwardly protruding edge 15 which reduces the diameter of the smaller opening 12 such that the shank 7 can still enter the end region of the smaller opening 12, optionally with a certain force, but that backsliding of the shank 7 is rendered more difficult.

The fastening tab 9 is connected to the base 5 of the abutment 3 by obliquely rising walls which are preferably rounded at the top in order to avoid sharp edges.

Figure 2:
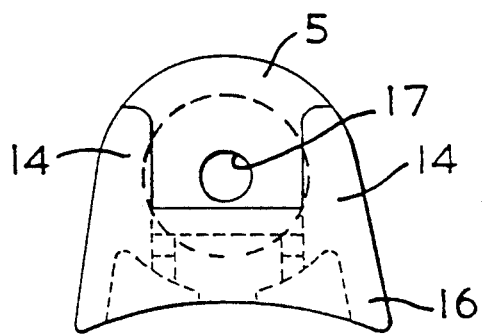
FIG. 2 shows the front view of the device (as viewed from the left FIG. 1)
Figure 3:
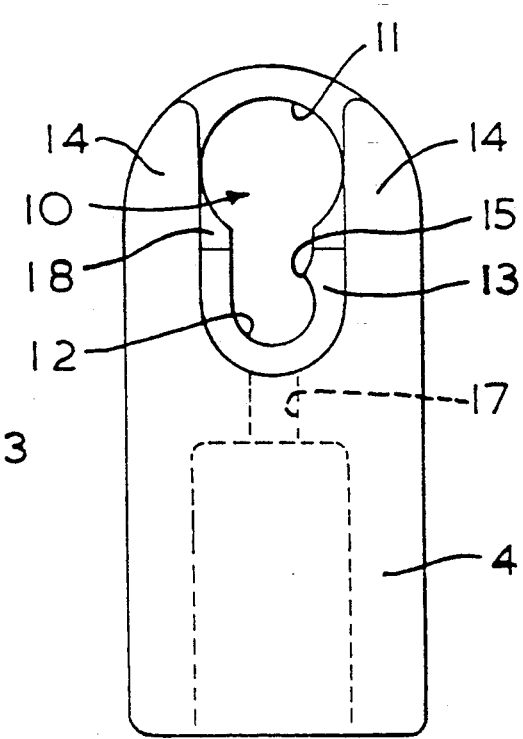
FIG. 3 shows a plan view of the device.

The walls 14 are extended downwardly, as shown in FIG. 2, these extensions 16 also being provided on the cylinder part 4. This allows perfect, non-rotatable support of the abutment on a round constructional element, the diameter of which can vary within certain limits.

To create a non-rotatable connection even if the constructional element has a plane surface, at least two T-bolts with the associated recesses 10 can be provided (not shown).

Clattering of the abutment 3 can be prevented by extremely precise matching of the height of the collar 13 and the height of the underside of the head 8. Clattering can also be prevented if a transverse initial tension is exerted on the fastening tab 9 by the extensions 16.

I claim:

1. A device for attaching a bowden cable to an associated structure and for supporting one end of the cable sheath comprising
    an abutment having a bore therein for receiving the sheath of the bowden cable;
    said bore being terminated by an end wall having an opening therethrough for passage of the transmission wire of the bowden cable;
    a fastening tab extending from said abutment;
    a keyhole-shaped recess in said tab having a large aperture for receiving the head of a T-bolt mounted on the structure, and a small aperture for receiving only the T-bolt shank;
    the height of said tab being tapered from a smaller value adjacent said large opening to a larger value adjacent said small opening; and
    means for preventing rotation of said device relative to the structure.

2. A device as claimed in claim 1, wherein said means comprises a second keyhole-shaped recess for receiving a second T-bolt.

3. A device as claimed in claim 1, wherein said means comprises a concave surface on said abutment and said tab for mounting on a tubular structure.

4. A device as claimed in claim 1 and further including
    a compressible detent adjacent said large opening and partially obstructing said small opening.

5. A device as claimed in claim 1, wherein a pair of walls are provided, one of said walls extending between and connected with each edge of said tab and said abutment.

* * * * *